«12» United States Patent
Seltzer et al.

(10) Patent No.: US 11,490,597 B2
(45) Date of Patent: Nov. 8, 2022

(54) SYSTEMS, METHODS, AND APPARATUS FOR ESTABLISHING KEEP OUT ZONES WITHIN WIRELESS CONTAINMENT REGIONS

(71) Applicant: Radio Systems Corporation, Knoxville, TN (US)

(72) Inventors: Richard Seltzer, Knoxville, TN (US); Duane A. Gerig, Knoxville, TN (US)

(*) Notice: Subject to any disclaimer, the term of this patent is extended or adjusted under 35 U.S.C. 154(b) by 1 day.

(21) Appl. No.: 16/920,692

(22) Filed: Jul. 4, 2020

(65) Prior Publication Data
US 2022/0000076 A1   Jan. 6, 2022

(51) Int. Cl.
*A01K 15/02* (2006.01)
*A01K 27/00* (2006.01)

(52) U.S. Cl.
CPC .......... *A01K 27/009* (2013.01); *A01K 15/023* (2013.01); *A01K 15/029* (2013.01); *A01K 27/001* (2013.01)

(58) Field of Classification Search
CPC ............................ A01K 15/023; A01K 27/009
See application file for complete search history.

(56) References Cited

U.S. PATENT DOCUMENTS

| | | |
|---|---|---|
| 2,364,994 A | 12/1944 | Moore |
| 2,741,224 A | 4/1956 | Putnam |
| 3,182,211 A | 5/1965 | Maratuech |
| 3,184,730 A | 5/1965 | Irish |
| 3,500,373 A | 3/1970 | Arthur |
| 3,735,757 A | 5/1973 | Mac Farland |
| 4,180,013 A | 12/1979 | Smith |

(Continued)

FOREIGN PATENT DOCUMENTS

| | | |
|---|---|---|
| CN | 101937015 A | 1/2011 |
| CN | 101112181 B | 11/2012 |

(Continued)

OTHER PUBLICATIONS

Ayele E., et al., "Highly Energy Efficient Animal Mobility Driven BLE Beacon Advertising Control for Wildlife Monitoring," IEEE Xplore, 2020, 8 pages.

(Continued)

*Primary Examiner* — Joshua D Huson
*Assistant Examiner* — Alanna K Peterson
(74) *Attorney, Agent, or Firm* — Baker, Donelson, Bearman, Caldwell & Berkowitz, PC

(57) ABSTRACT

A system comprising a first transmitter for transmitting a first signal at a first frequency and a second transmitter for transmitting a second signal at a second frequency. The system includes a collar unit comprising a filter for receiving a combined signal, wherein the combined signal comprises the first signal and the second signal, wherein the filter includes a first antenna for detecting the first signal and a second antenna for detecting the second signal. The collar unit includes at least one signal analysis component configured to analyze the first signal and the second signal. The collar unit is configured to instruct a stimulus delivery unit to deliver a stimulus to the animal when the first signal voltage falls below a first value and the second signal voltage exceeds a second value.

12 Claims, 9 Drawing Sheets

(56) References Cited

U.S. PATENT DOCUMENTS

| | | | |
|---|---|---|---|
| 4,335,682 A | * | 6/1982 | Gonda .................. A01K 15/021 |
| | | | 119/719 |
| 4,426,884 A | | 1/1984 | Polchaninoff |
| 4,783,646 A | | 11/1988 | Matsuzaki |
| 4,794,402 A | | 12/1988 | Gonda et al. |
| 4,802,482 A | | 2/1989 | Gonda et al. |
| 4,947,795 A | | 8/1990 | Farkas |
| 4,969,418 A | | 11/1990 | Jones |
| 5,054,428 A | | 10/1991 | Farkus |
| 5,067,441 A | | 11/1991 | Weinstein |
| 5,159,580 A | | 10/1992 | Andersen et al. |
| 5,161,485 A | | 11/1992 | McDade |
| 5,182,032 A | | 1/1993 | Dickie et al. |
| 5,207,178 A | | 5/1993 | McDade et al. |
| 5,207,179 A | | 5/1993 | Arthur et al. |
| 5,471,954 A | | 12/1995 | Gonda et al. |
| 5,526,006 A | | 6/1996 | Akahane et al. |
| 5,559,498 A | | 9/1996 | Westrick et al. |
| 5,576,972 A | | 11/1996 | Harrison |
| 5,586,521 A | | 12/1996 | Kelley |
| 5,601,054 A | | 2/1997 | So |
| 5,610,588 A | * | 3/1997 | Yarnall, Jr. .......... A01K 15/023 |
| | | | 340/573.3 |
| 5,642,690 A | | 7/1997 | Calabrese et al. |
| 5,749,324 A | | 5/1998 | Moore |
| 5,794,569 A | | 8/1998 | Titus et al. |
| 5,810,747 A | | 9/1998 | Brudny et al. |
| 5,815,077 A | | 9/1998 | Christiansen |
| 5,844,489 A | | 12/1998 | Yarnall, Jr. et al. |
| 5,857,433 A | | 1/1999 | Files |
| 5,870,029 A | | 2/1999 | Otto et al. |
| 5,872,516 A | | 2/1999 | Bonge, Jr. |
| 5,886,669 A | | 3/1999 | Kita |
| 5,913,284 A | | 6/1999 | Van Curen et al. |
| 5,923,254 A | | 7/1999 | Brune |
| 5,927,233 A | | 7/1999 | Mainini et al. |
| 5,933,079 A | | 8/1999 | Frink |
| 5,934,225 A | | 8/1999 | Williams |
| 5,949,350 A | | 9/1999 | Girard et al. |
| 5,957,983 A | | 9/1999 | Tominaga |
| 5,982,291 A | | 11/1999 | Williams et al. |
| 6,016,100 A | | 1/2000 | Boyd et al. |
| 6,019,066 A | | 2/2000 | Taylor |
| 6,028,531 A | | 2/2000 | Wanderlich |
| 6,047,664 A | | 4/2000 | Lyerly |
| 6,067,018 A | | 5/2000 | Skelton |
| 6,075,443 A | | 6/2000 | Schepps et al. |
| 6,166,643 A | | 12/2000 | Janning et al. |
| 6,170,439 B1 | | 1/2001 | Duncan et al. |
| 6,184,790 B1 | | 2/2001 | Gerig |
| 6,196,990 B1 | | 3/2001 | Zicherman |
| 6,204,762 B1 | | 3/2001 | Dering et al. |
| 6,215,314 B1 | | 4/2001 | Frankewich, Jr. |
| 6,230,031 B1 | | 5/2001 | Barber |
| 6,230,661 B1 | | 5/2001 | Yarnall, Jr. et al. |
| 6,232,880 B1 | | 5/2001 | Anderson et al. |
| 6,271,757 B1 | | 8/2001 | Touchton et al. |
| 6,297,766 B1 | | 10/2001 | Koeller |
| 6,327,999 B1 | | 12/2001 | Gerig |
| 6,353,390 B1 | | 3/2002 | Beri et al. |
| 6,360,697 B1 | | 3/2002 | Williams |
| 6,360,698 B1 | | 3/2002 | Stapelfeld et al. |
| 6,404,338 B1 | | 6/2002 | Koslar |
| 6,415,742 B1 | | 7/2002 | Lee et al. |
| 6,426,464 B1 | | 7/2002 | Spellman et al. |
| 6,427,079 B1 | | 7/2002 | Schneider et al. |
| 6,431,121 B1 | | 8/2002 | Mainini et al. |
| 6,431,122 B1 | | 8/2002 | Westrick et al. |
| 6,441,778 B1 | | 8/2002 | Durst et al. |
| 6,459,378 B2 | | 10/2002 | Gerig |
| 6,487,992 B1 | | 12/2002 | Hollis |
| 6,561,137 B2 | | 5/2003 | Oakman |
| 6,581,546 B1 | | 6/2003 | Dalland et al. |
| 6,588,376 B1 | | 7/2003 | Groh |
| 6,598,563 B2 | | 7/2003 | Kim et al. |
| 6,600,422 B2 | | 7/2003 | Barry et al. |
| 6,637,376 B2 | | 10/2003 | Lee et al. |
| 6,657,544 B2 | | 12/2003 | Barry et al. |
| 6,668,760 B2 | | 12/2003 | Groh et al. |
| 6,700,492 B2 | | 3/2004 | Touchton et al. |
| 6,747,555 B2 | | 6/2004 | Fellenstein et al. |
| 6,798,887 B1 | | 9/2004 | Andre |
| 6,799,537 B1 | | 10/2004 | Liao |
| 6,807,720 B2 | | 10/2004 | Brune et al. |
| 6,820,025 B2 | | 11/2004 | Bachmann et al. |
| 6,825,768 B2 | | 11/2004 | Stapelfeld et al. |
| 6,830,012 B1 | | 12/2004 | Swan |
| 6,833,790 B2 | | 12/2004 | Mejia et al. |
| 6,874,447 B1 | | 4/2005 | Kobett |
| 6,888,502 B2 | | 5/2005 | Beigel et al. |
| 6,901,883 B2 | | 6/2005 | Gillis et al. |
| 6,903,682 B1 | | 6/2005 | Maddox |
| 6,907,844 B1 | | 6/2005 | Crist et al. |
| 6,907,883 B2 | | 6/2005 | Lin |
| 6,921,089 B2 | | 7/2005 | Groh et al. |
| 6,923,146 B2 | | 8/2005 | Korbitz et al. |
| 6,928,958 B2 | | 8/2005 | Crist et al. |
| 6,937,647 B1 | | 8/2005 | Boyd et al. |
| 6,956,483 B2 | | 10/2005 | Schmitt et al. |
| 6,970,090 B1 | | 11/2005 | Sciarra |
| 7,061,385 B2 | | 6/2006 | Fong et al. |
| 7,079,024 B2 | | 7/2006 | Alarcon et al. |
| 7,114,466 B1 | | 10/2006 | Mayer |
| 7,142,167 B2 | | 11/2006 | Rochelle et al. |
| 7,164,354 B1 | | 1/2007 | Panzer |
| 7,173,535 B2 | | 2/2007 | Bach et al. |
| 7,198,009 B2 | | 4/2007 | Crist et al. |
| 7,222,589 B2 | | 5/2007 | Lee et al. |
| 7,249,572 B2 | | 7/2007 | Goetzl et al. |
| 7,252,051 B2 | | 8/2007 | Napolez et al. |
| 7,259,718 B2 | | 8/2007 | Patterson et al. |
| 7,267,081 B2 | | 9/2007 | Steinbacher |
| 7,275,502 B2 | | 10/2007 | Boyd et al. |
| 7,296,540 B2 | | 11/2007 | Boyd |
| 7,319,397 B2 | | 1/2008 | Chung et al. |
| 7,328,671 B2 | | 2/2008 | Kates |
| 7,339,474 B2 | | 3/2008 | Easley et al. |
| 7,382,328 B2 | | 6/2008 | Lee et al. |
| 7,394,390 B2 | | 7/2008 | Gerig |
| 7,395,966 B2 | | 7/2008 | Braiman |
| 7,403,744 B2 | | 7/2008 | Bridgelall |
| 7,404,379 B2 | | 7/2008 | Nottingham et al. |
| 7,411,492 B2 | | 8/2008 | Greenberg et al. |
| 7,426,906 B2 | | 9/2008 | Nottingham et al. |
| 7,434,541 B2 | | 10/2008 | Kates |
| 7,443,298 B2 | | 10/2008 | Cole et al. |
| 7,477,155 B2 | | 1/2009 | Bach et al. |
| 7,503,285 B2 | | 3/2009 | Mainini et al. |
| 7,518,275 B2 | | 4/2009 | Suzuki et al. |
| 7,518,522 B2 | | 4/2009 | So et al. |
| 7,538,679 B2 | | 5/2009 | Shanks |
| 7,546,817 B2 | | 6/2009 | Moore |
| 7,552,699 B2 | | 6/2009 | Moore |
| 7,559,291 B2 | | 7/2009 | Reinhart |
| 7,562,640 B2 | | 7/2009 | Lalor |
| 7,565,885 B2 | | 7/2009 | Moore |
| 7,574,979 B2 | | 8/2009 | Nottingham et al. |
| 7,583,931 B2 | | 9/2009 | Eu et al. |
| 7,602,302 B2 | | 10/2009 | Hokuf et al. |
| 7,612,668 B2 | | 11/2009 | Harvey |
| 7,616,124 B2 | | 11/2009 | Paessel et al. |
| 7,656,291 B2 | | 2/2010 | Rochelle et al. |
| 7,658,166 B1 | | 2/2010 | Rheinschmidt, Jr. et al. |
| 7,667,599 B2 | | 2/2010 | Mainini et al. |
| 7,667,607 B2 | | 2/2010 | Gerig et al. |
| 7,680,645 B2 | | 3/2010 | Li et al. |
| 7,705,736 B2 | | 4/2010 | Kedziora |
| 7,710,263 B2 | | 5/2010 | Boyd |
| 7,760,137 B2 | | 7/2010 | Martucci et al. |
| 7,779,788 B2 | | 8/2010 | Moore |
| 7,786,876 B2 | | 8/2010 | Troxler et al. |
| 7,804,724 B2 | | 9/2010 | Way |
| 7,814,865 B2 | | 10/2010 | Tracy et al. |
| 7,828,221 B2 | | 11/2010 | Kwon |

(56) References Cited

U.S. PATENT DOCUMENTS

| | | |
|---|---|---|
| 7,830,257 B2 | 11/2010 | Hassell |
| 7,834,769 B2 | 11/2010 | Hinkle et al. |
| 7,841,301 B2 | 11/2010 | Mainini et al. |
| 7,856,947 B2 | 12/2010 | Giunta |
| 7,864,057 B2 | 1/2011 | Milnes et al. |
| 7,868,912 B2 | 1/2011 | Venetianer et al. |
| 7,900,585 B2 | 3/2011 | Lee et al. |
| 7,918,190 B2 | 4/2011 | Belcher et al. |
| 7,944,359 B2 | 5/2011 | Fong et al. |
| 7,946,252 B2 | 5/2011 | Lee, IV et al. |
| 7,978,078 B2 | 7/2011 | Copeland et al. |
| 7,996,983 B2 | 8/2011 | Lee et al. |
| 8,011,327 B2 | 9/2011 | Mainini et al. |
| 8,047,161 B2 | 11/2011 | Moore et al. |
| 8,049,630 B2 | 11/2011 | Chao et al. |
| 8,065,978 B2 | 11/2011 | Duncan et al. |
| 8,069,823 B2 | 12/2011 | Mainini et al. |
| 8,098,164 B2 | 1/2012 | Gerig et al. |
| 8,159,355 B2 | 4/2012 | Gerig et al. |
| 8,161,915 B2 | 4/2012 | Kim |
| 8,185,345 B2 | 5/2012 | Mainini |
| 8,232,909 B2 | 7/2012 | Kroeger et al. |
| 8,240,085 B2 | 8/2012 | Hill |
| 8,269,504 B2 | 9/2012 | Gerig |
| 8,274,396 B2 | 9/2012 | Gurley et al. |
| 8,297,233 B2 | 10/2012 | Rich et al. |
| 8,342,134 B2 | 1/2013 | Lee et al. |
| 8,342,135 B2 | 1/2013 | Peinetti et al. |
| 8,430,064 B2 | 4/2013 | Groh et al. |
| 8,436,735 B2 | 5/2013 | Mainini et al. |
| 8,447,510 B2 | 5/2013 | Fitzpatrick et al. |
| 8,451,130 B2 | 5/2013 | Mainini |
| 8,456,296 B2 | 6/2013 | Piltonen et al. |
| 8,483,262 B2 | 7/2013 | Mainini et al. |
| 8,714,113 B2 | 5/2014 | Lee, IV et al. |
| 8,715,824 B2 | 5/2014 | Rawlings et al. |
| 8,736,499 B2 | 5/2014 | Goetzl et al. |
| 8,779,925 B2 | 7/2014 | Rich et al. |
| 8,803,692 B2 | 8/2014 | Goetzl et al. |
| 8,807,089 B2 | 8/2014 | Brown et al. |
| 8,823,513 B2 | 9/2014 | Jameson et al. |
| 8,854,215 B1 | 10/2014 | Ellis et al. |
| 8,866,605 B2 | 10/2014 | Gibson |
| 8,908,034 B2 | 12/2014 | Bordonaro |
| 8,917,172 B2 | 12/2014 | Charych |
| 8,947,240 B2 | 2/2015 | Mainini |
| 8,967,085 B2 | 3/2015 | Gillis et al. |
| 9,035,773 B2 | 5/2015 | Petersen et al. |
| 9,125,380 B2 | 9/2015 | Deutsch |
| 9,131,660 B2 | 9/2015 | Womble |
| 9,186,091 B2 | 11/2015 | Mainini et al. |
| 9,204,251 B1 | 12/2015 | Mendelson et al. |
| 9,307,745 B2 | 4/2016 | Mainini |
| 9,516,863 B2 | 12/2016 | Gerig et al. |
| 9,861,076 B2 | 1/2018 | Rochelle et al. |
| 10,045,512 B2 * | 8/2018 | Mainini ............... H04W 4/02 |
| 10,070,621 B1 | 9/2018 | Hacham David |
| 10,514,439 B2 | 12/2019 | Seltzer |
| 10,757,672 B1 | 8/2020 | Knas et al. |
| 10,806,126 B1 | 10/2020 | Loewke et al. |
| 10,879,600 B2 | 12/2020 | Kim et al. |
| 2002/0010390 A1 | 1/2002 | Guice et al. |
| 2002/0015094 A1 | 2/2002 | Kuwano et al. |
| 2002/0036569 A1 | 3/2002 | Martin |
| 2002/0092481 A1 | 7/2002 | Spooner |
| 2002/0196151 A1 | 12/2002 | Troxler |
| 2003/0034887 A1 | 2/2003 | Crabtree et al. |
| 2003/0035051 A1 | 2/2003 | Cho et al. |
| 2003/0116099 A1 | 6/2003 | Kim et al. |
| 2003/0154928 A1 | 8/2003 | Lee et al. |
| 2003/0218539 A1 | 11/2003 | Hight |
| 2004/0108939 A1 | 6/2004 | Giunta |
| 2004/0162875 A1 | 8/2004 | Brown |
| 2004/0263322 A1 | 12/2004 | Onaru et al. |
| 2005/0000469 A1 | 1/2005 | Giunta et al. |
| 2005/0007251 A1 | 1/2005 | Crabtree et al. |
| 2005/0020279 A1 | 1/2005 | Markhovsky et al. |
| 2005/0035865 A1 | 2/2005 | Brennan et al. |
| 2005/0059909 A1 | 3/2005 | Burgess |
| 2005/0081797 A1 | 4/2005 | Laitinen et al. |
| 2005/0139169 A1 | 6/2005 | So et al. |
| 2005/0145196 A1 | 7/2005 | Crist et al. |
| 2005/0145199 A1 | 7/2005 | Napolez et al. |
| 2005/0148346 A1 | 7/2005 | Maloney et al. |
| 2005/0172912 A1 | 8/2005 | Crist et al. |
| 2005/0217606 A1 | 10/2005 | Lee et al. |
| 2005/0231353 A1 | 10/2005 | DiPoala et al. |
| 2005/0254663 A1 | 11/2005 | Raptopoulos et al. |
| 2005/0258715 A1 | 11/2005 | Schlabach et al. |
| 2005/0280544 A1 | 12/2005 | Mishelevich |
| 2005/0280546 A1 | 12/2005 | Ganley et al. |
| 2005/0288007 A1 | 12/2005 | Benco et al. |
| 2006/0000015 A1 | 1/2006 | Duncan |
| 2006/0011144 A1 | 1/2006 | Kates |
| 2006/0011145 A1 | 1/2006 | Kates et al. |
| 2006/0037559 A1 | 2/2006 | Belcher |
| 2006/0061469 A1 | 3/2006 | Jaeger et al. |
| 2006/0092676 A1 | 5/2006 | Liptak et al. |
| 2006/0102100 A1 | 5/2006 | Becker et al. |
| 2006/0102101 A1 | 5/2006 | Kim |
| 2006/0112901 A1 | 6/2006 | Gomez |
| 2006/0196445 A1 | 9/2006 | Kates |
| 2006/0197672 A1 | 9/2006 | Talamas, Jr. et al. |
| 2007/0011339 A1 | 1/2007 | Brown |
| 2007/0107668 A1 | 5/2007 | Eaton et al. |
| 2007/0197878 A1 | 8/2007 | Shklarski |
| 2007/0204803 A1 | 9/2007 | Ramsay |
| 2007/0204804 A1 | 9/2007 | Swanson et al. |
| 2007/0209604 A1 | 9/2007 | Groh et al. |
| 2007/0249470 A1 | 10/2007 | Niva et al. |
| 2007/0266959 A1 | 11/2007 | Brooks et al. |
| 2008/0004539 A1 | 1/2008 | Ross |
| 2008/0055155 A1 | 3/2008 | Hensley et al. |
| 2008/0058670 A1 | 3/2008 | Mainini et al. |
| 2008/0061978 A1 | 3/2008 | Huang |
| 2008/0119757 A1 | 5/2008 | Winter |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1 | 7/2008 | Goetzl |
| 2008/0186167 A1 | 8/2008 | Ramachandra |
| 2008/0204322 A1 | 8/2008 | Oswald et al. |
| 2008/0216766 A1 | 9/2008 | Martin et al. |
| 2008/0236514 A1 | 10/2008 | Johnson et al. |
| 2008/0252527 A1 | 10/2008 | Garcia |
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0061772 A1 | 3/2009 | Moon et al. |
| 2009/0082830 A1 | 3/2009 | Folkerts et al. |
| 2009/0102668 A1 | 4/2009 | Thompson et al. |
| 2009/0112284 A1 | 4/2009 | Smith et al. |
| 2009/0129338 A1 | 5/2009 | Horn et al. |
| 2009/0224909 A1 | 9/2009 | Derrick et al. |
| 2009/0239586 A1 | 9/2009 | Boeve et al. |
| 2009/0289785 A1 | 11/2009 | Leonard |
| 2009/0289844 A1 | 11/2009 | Palsgrove et al. |
| 2009/0299742 A1 | 12/2009 | Toman et al. |
| 2010/0008011 A1 | 1/2010 | Ogram |
| 2010/0019903 A1 | 1/2010 | Sawaya |
| 2010/0047119 A1 | 2/2010 | Cressy |
| 2010/0049364 A1 | 2/2010 | Landry et al. |
| 2010/0107985 A1 | 5/2010 | O'Hare |
| 2010/0139576 A1 | 6/2010 | Kim et al. |
| 2010/0201525 A1 | 8/2010 | Bahat et al. |
| 2010/0231391 A1 | 9/2010 | Dror et al. |
| 2010/0238022 A1 | 9/2010 | Au et al. |
| 2010/0315241 A1 | 12/2010 | Jow |
| 2010/0321180 A1 | 12/2010 | Dempsey |
| 2011/0140967 A1 | 6/2011 | Lopez et al. |

(56) References Cited

U.S. PATENT DOCUMENTS

| | | |
|---|---|---|
| 2011/0182438 A1 | 7/2011 | Koike et al. |
| 2011/0203529 A1 | 8/2011 | Mainini et al. |
| 2012/0000431 A1 | 1/2012 | Khoshkish et al. |
| 2012/0006282 A1 | 1/2012 | Kates |
| 2012/0032855 A1 | 2/2012 | Reede |
| 2012/0037088 A1 | 2/2012 | Altenhofen |
| 2012/0078139 A1 | 3/2012 | Aldridge et al. |
| 2012/0087204 A1 | 4/2012 | Urbano et al. |
| 2012/0132151 A1 | 5/2012 | Touchton et al. |
| 2012/0165012 A1 | 6/2012 | Fischer et al. |
| 2012/0236688 A1 | 9/2012 | Spencer et al. |
| 2012/0312250 A1 | 12/2012 | Jesurum |
| 2013/0099920 A1 | 4/2013 | Song et al. |
| 2013/0099922 A1 | 4/2013 | Lohbihler |
| 2013/0157564 A1 | 6/2013 | Curtis et al. |
| 2013/0169441 A1 | 7/2013 | Wilson |
| 2013/0181861 A1 | 7/2013 | Zohar et al. |
| 2013/0203027 A1 | 8/2013 | De Villers-Sidani et al. |
| 2013/0227540 A1 | 8/2013 | Ruster et al. |
| 2013/0321159 A1 | 12/2013 | Schofield et al. |
| 2013/0340305 A1 | 12/2013 | Mobley |
| 2014/0020635 A1 | 1/2014 | Sayers et al. |
| 2014/0053788 A1 | 2/2014 | Riddell |
| 2014/0057232 A1 | 2/2014 | Wetmore et al. |
| 2014/0062695 A1 | 3/2014 | Rosen et al. |
| 2014/0069350 A1 | 3/2014 | Riddell |
| 2014/0073939 A1 | 3/2014 | Rodriguez-Llorente et al. |
| 2014/0120943 A1 | 5/2014 | Shima |
| 2014/0123912 A1 | 5/2014 | Menkes et al. |
| 2014/0132608 A1 | 5/2014 | Mund et al. |
| 2014/0174376 A1 | 6/2014 | Touchton et al. |
| 2014/0176305 A1 | 6/2014 | Aljadeff |
| 2014/0228649 A1 | 8/2014 | Rayner et al. |
| 2014/0228927 A1 | 8/2014 | Ahmad et al. |
| 2014/0253368 A1 | 9/2014 | Holder |
| 2014/0253389 A1 | 9/2014 | Beauregard |
| 2014/0261235 A1 | 9/2014 | Rich et al. |
| 2014/0265568 A1 | 9/2014 | Crafts et al. |
| 2014/0267299 A1 | 9/2014 | Couse |
| 2014/0275824 A1 | 9/2014 | Couse et al. |
| 2014/0276278 A1 | 9/2014 | Smith et al. |
| 2014/0307888 A1 | 10/2014 | Alderson et al. |
| 2014/0343599 A1 | 11/2014 | Smith et al. |
| 2014/0358592 A1 | 12/2014 | Wedig et al. |
| 2015/0040840 A1 | 2/2015 | Muetzel et al. |
| 2015/0043744 A1 | 2/2015 | Lagodzinski et al. |
| 2015/0053144 A1 | 2/2015 | Bianchi et al. |
| 2015/0075446 A1 | 3/2015 | Hu |
| 2015/0080013 A1 | 3/2015 | Venkatraman et al. |
| 2015/0107531 A1 | 4/2015 | Golden |
| 2015/0149111 A1 | 5/2015 | Kelly et al. |
| 2015/0163412 A1 | 6/2015 | Holley et al. |
| 2015/0172872 A1 | 6/2015 | Alsehly et al. |
| 2015/0199490 A1 | 7/2015 | Iancu et al. |
| 2015/0223013 A1 | 8/2015 | Park et al. |
| 2015/0289111 A1 | 10/2015 | Ozkan et al. |
| 2015/0350848 A1 | 12/2015 | Eramian |
| 2015/0358768 A1 | 12/2015 | Luna et al. |
| 2016/0015005 A1 | 1/2016 | Brown, Jr. et al. |
| 2016/0021506 A1 | 1/2016 | Bonge, Jr. |
| 2016/0021850 A1 | 1/2016 | Stapelfeld et al. |
| 2016/0029466 A1 | 1/2016 | DeMao et al. |
| 2016/0044444 A1 | 2/2016 | Rattner et al. |
| 2016/0084801 A1 | 3/2016 | Robinson et al. |
| 2016/0094419 A1 | 3/2016 | Peacock et al. |
| 2016/0102879 A1 | 4/2016 | Guest et al. |
| 2016/0125867 A1 | 5/2016 | Jarvinen et al. |
| 2016/0150362 A1 | 5/2016 | Shaprio et al. |
| 2016/0174099 A1 | 6/2016 | Goldfain |
| 2016/0178392 A1 | 6/2016 | Goldfain |
| 2016/0187454 A1 | 6/2016 | Orman et al. |
| 2016/0234649 A1 | 8/2016 | Finnerty et al. |
| 2016/0253987 A1 | 9/2016 | Chattell |
| 2016/0292635 A1 | 10/2016 | Todasco |
| 2016/0335917 A1 | 11/2016 | Lydecker et al. |
| 2016/0363664 A1 | 12/2016 | Mindell et al. |
| 2016/0366813 A1 | 12/2016 | Haneda et al. |
| 2017/0026798 A1 | 1/2017 | Prevatt |
| 2017/0042121 A1 | 2/2017 | Jersa, III et al. |
| 2017/0212205 A1 | 7/2017 | Bialer et al. |
| 2017/0323630 A1 | 11/2017 | Stickney et al. |
| 2018/0027772 A1 | 2/2018 | Gordon et al. |
| 2018/0077509 A1 | 3/2018 | Jones et al. |
| 2018/0078735 A1 | 3/2018 | Dalgleish et al. |
| 2018/0094451 A1 | 4/2018 | Peter et al. |
| 2018/0188351 A1 | 7/2018 | Jones et al. |
| 2018/0190311 A1 | 7/2018 | Kato et al. |
| 2018/0210704 A1 | 7/2018 | Jones et al. |
| 2018/0234134 A1 | 8/2018 | Tang et al. |
| 2018/0235182 A1 | 8/2018 | Bocknek |
| 2018/0249680 A1 | 9/2018 | Van Curen et al. |
| 2018/0303066 A1 | 10/2018 | Weimin et al. |
| 2018/0315262 A1 | 11/2018 | Love et al. |
| 2019/0013003 A1 | 1/2019 | Baughman et al. |
| 2019/0066651 A1 | 2/2019 | Yang |
| 2019/0110430 A1 | 4/2019 | Badiou |
| 2019/0165832 A1 | 5/2019 | Khanduri et al. |
| 2020/0367810 A1 | 11/2020 | Shouldice et al. |

FOREIGN PATENT DOCUMENTS

| | | |
|---|---|---|
| CN | 102793568 B | 12/2014 |
| JP | H0974774 A | 3/1997 |
| KR | 20130128704 A | 11/2013 |
| KR | 20180059684 A | 6/2018 |
| KR | 101911312-81 | 1/2019 |
| WO | WO-0057692 A1 | 10/2000 |
| WO | WO-02060240 A3 | 2/2003 |
| WO | WO-2006000015 A1 | 1/2006 |
| WO | WO-2008085812 A2 | 7/2008 |
| WO | WO-2008140992 A1 | 11/2008 |
| WO | WO-2009105243 A2 | 8/2009 |
| WO | WO-2009106896 A2 | 9/2009 |
| WO | WO-2011055004 A1 | 5/2011 |
| WO | WO-2011136816 A1 | 11/2011 |
| WO | WO-2011160698 A1 | 12/2011 |
| WO | WO-2012122607 A1 | 9/2012 |
| WO | WO-2015015047 A1 | 2/2015 |
| WO | WO-2016204799 A1 | 12/2016 |

OTHER PUBLICATIONS

Crutchfield., "What You Need to Know About Sound Masking," 2021, pp. 1-7.
Integrated Building System., "The What, Where, Why and How of Sound Masking," 2016, 6 pages.
Nam M., et al., "Combined Scheduling of Sensing and Communication for Real-Time Indoor Tracking in Assisted Living," IEEE Real Time System Symposium, 2007, 10 pages.
Radoi I.E., et al., "Tracking and Monitoring Horses in the Wild Using Wireless Sensor Networks," IEEE International Conference on Wireless and Mobile Computing, Networking and Communications, 2015, 8 pages.
Supplementary European Search Report for European Application No. 18887374.9, dated Aug. 10, 2021, 7 pages.
Supplementary European Search Report for European Application No. 18888089.2, dated Aug. 6, 2021, 6 pages.
Supplementary European Search Report for European Application No. 18889799.5, dated Aug. 13, 2021, 10 pages.
Wood D.J. "Speech Privacy & Sound Masking in Modern Architecture," 2008, 51 pages.
Baba A. I., et al., "Calibrating Time of Flight in Two Way Ranging," IEEE Xplore Digital Library, Dec. 2011, pp. 393-397.
Eileen A., "How To Protect Your Dog From Loud and Scary Sounds," 2013, pp. 1-8.
Extended European Search Report for Application No. EP17180645, dated May 9, 2018, 7 pages.
Extended European Search Report for European Application No. 18738816, dated Sep. 29, 2020, 10 pages.
Extended European Search Report for European Application No. 11784149.4, dated Nov. 17, 2017, 7 pages.

(56) References Cited

OTHER PUBLICATIONS

Extended European Search Report for European Application No. 15735439.0, dated Oct. 18, 2017, 9 pages.
Extended European Search Report for European Application No. 15895839.7, dated Oct. 9, 2018, 5 pages.
Extended European Search Report for European Application No. 17162289.7, dated Aug. 31, 2017, 7 pages.
Extended European Search Report for European Application No. 18738547.1, dated Sep. 24, 2020, 9 pages.
Extended European Search Report for European Application No. 18738743.6, dated Sep. 24, 2020, 11 pages.
High Tech Products, Inc., "Human Contain Model X-10 Rechargeable Multi-function Electronic Dog Fence Ultra-system," Internet citation, Retrieved from the internet: URL: http://web.archive.org/web/20120112221915/http://hightechpet.com/user_Manuals/HC%20X-10_Press.pdf [retrieved on Apr. 10, 2017], Apr. 28, 2012, pp. 1-32, XP008184171.
Info Unlimited "Canine 10RC-HP10 Instructions"; Instruction manual V.0420; Publication 12 & 15 [online]. Jun. 14, 2013 [retrieved Sep. 29, 2020]. Retrieved from the Internet: URL: https://www.amazing1.com/content/download/CANINE10_Instructions.pdf.
Info Unlimited "Canine 10RC-HP10 Instructions" Instruction manual V.0420. [Retrieved on Jul. 8, 2017]. Retrieved from the Internet: URL: https://www.amazing1.com/content/download/CANINE10_Instructions.pdf.
International Search Report and Written Opinion for Application No. PCT/US2020/042601, dated Nov. 9, 2020, 11 pages.
International Preliminary Report for Patentability Chapter II for International Application No. PCT/US2014/024875, dated Mar. 12, 2015, 17 pages.
International Preliminary Report on Patentability for Application No. PCT/US2015/043653, dated Dec. 19, 2017, 14 pages.
International Search Report and Written Opinion for Application No. PCT/US2018/013737, dated Mar. 7, 2018, 8 pages.
International Search Report and Written Opinion for Application No. PCT/US2018/013738, dated Mar. 20, 2018, 6 pages.
International Search Report and Written Opinion for Application No. PCT/US2018/013740, dated Mar. 20, 2018, 6 pages.
International Search Report and Written Opinion for Application No. PCT/US2018/019887, dated May 8, 2018, 10 pages.
International Search Report and Written Opinion for Application No. PCT/US2018/065122, dated Mar. 25, 2019, 7 pages.
International Search Report and Written Opinion for Application No. PCT/US2018/065154, dated Apr. 23, 2019, 7 pages.
International Search Report and Written Opinion for Application No. PCT/US2018/065938, dated Mar. 8, 2019, 9 pages.
International Search Report and Written Opinion for Application No. PCT/US2020/016617, dated Apr. 27, 2020, 13 pages.
International Search Report and Written Opinion for International Application No. PCT/US2014/024875, dated Jun. 27, 2014, 12 pages.
International Search Report for International Application No. PCT/US2014/020344, dated Jun. 5, 2014, 2 pages.
International Search Report for International Application No. PCT/US2014/066650, dated Feb. 19, 2015, 3 pages (Outgoing).
International Search Report for International Application No. PCT/US2015/010864, Form PCT/ISA/210 dated Apr. 13, 2015, 2 pages.
International Search Report for International Application No. PCT/US2015/043653, Form PCT/ISA/210 dated Oct. 23, 2015, 2 pages.
Jondhale S. R., et al., "Issues and Challenges in RSSI Based Target Localization and Tracking in Wireless Sensor Networks," International Conference on Automatic Control and Dynamic Optimization Techniques (ICACDOT),2016, pp. 594-598.
Joshi A., et al., "GPS-less Animal Tracking System," Fourth International Conference on Wireless Communication and Sensor Networks,2008, pp. 120-125.
Kuo S., et al., "Detecting Movement of Beacons in Location-Tracking Wireless Sensor Networks," IEEE 66th Vehicular Technology Conference, 2007, pp. 362-366.
Kuo S., et al., "The Beacon Movement Detection Problem in Wireless Sensor Networks for Localization Applications," IEEE Transactions on Mobile Computing, Oct. 2009, vol. 8(10), pp. 1326-1338.
Millner H., et al., "Wireless 3D Localization of Animals for Trait and Behavior Analysis in Indoor & Outdoor Areas," IEEE MTT-S International Microwave Workshop on Wireless Sensing, Local Positioning, and RFID, 2009, pp. 1-4.
Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650, dated Feb. 19, 2015, 1 page.
Panicker, G. J., et al., "A LoRa Wireless Mesh Network for Wide-Area Animal Tracking," IEEE International Conference on Electrical, Computer and Communication Technologies,2019, pp. 1-5.
Welch G., et al., "An Introduction to the Kalman Filter," Department of Computer Science, Jul. 24, 2006, pp. 1-16.
Written Opinion for International Application No. PCT/US2014/066650, dated Feb. 19, 2015, 15 pages(outgoing).
Written Opinion for International Application No. PCT/US2015/043653, Form PCT/ISA/237 dated Oct. 23, 2015, 13 pages.
Written Opinion of the International Application No. PCT/US2015/010864, Form PCT/ISA/237 dated Apr. 13, 2015, 6 pages.
Cavalcante A.M., et al., "Audio Beacon Providing Location-Aware Content for Low-End Mobile Devices," International Conference on Indoor Positioning and Indoor Navigation, 2012, 1-9 pages.
Dieng O., et al., "Outdoor Localization and Distance Estimation Based on Dynamic RSSI Measurements in LoRa Networks," International Conference on Wireless and Mobile Computing, Networking and Communications, 2019, 6 pages.
Extended European Search Report for Application No. EP21178870, dated Dec. 8, 2021, 8 pages.
Jukan A., et al., "Smart Computing and Sensing Technologies for Animal Welfare: A Systematic Review," ACM Computing Surveys, 2016, vol. 50(1), pp. 1-27.
Wang Q., et al., The Recent Progress in Animal Models of Depression, Progress in Neuro-psychopharmacology & Biological Psychiatry , 2017, vol. 77, pp. 99-109.

* cited by examiner

SYSTEMS, METHODS, AND APPARATUS FOR ESTABLISHING KEEP OUT ZONES WITHIN WIRELESS CONTAINMENT REGIONS

RELATED APPLICATIONS

Not applicable

TECHNICAL FIELD

The disclosure herein involves the inclusion of avoidance zones within a wireless containment system safe zone, under an embodiment.

BACKGROUND

Wired and wireless containment systems generally prevent movement of an animal beyond defined boundaries and free movement of an animal within defined boundaries. There exists a need to include avoidance regions within the safe zones to keep pets away from trash cans, gardens, etc.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Pet owners may experience a variety of problems inside and outside the home caused by pets entering areas that the owner considers off-limits. For example, inside the home, dogs may get into trash cans, cats may climb on tables, and both cats and dogs may climb on couches. Outside the home, dogs and cats may cause destruction to garden areas, breach trash cans, and/or chew on air conditioning lines.

Many of these same pet owners may use containment systems to keep their pets contained within a containment region. There are two basic types of containment systems: wired and wireless. The wired containment system utilizes a magnetic field containment boundary defined by a buried wire. Pickup coils in the collar pick up the magnetic field developed by the current driven through the wire and warn and/or correct the pet when in proximity to the wire. The wireless containment system comprises a containment boundary defined by the magnetic field driven by the coils of a base station transmitter. Pickup coils in the collar pick up the electromagnetic field driven by the transmitter and warn and or correct the pet when the field diminishes to a specified level.

To combat the issue of keeping pets away from small regions, electronic avoidance transmitter beacon/collar systems may be used. Such systems typically operate by producing a magnetic field that is picked up by coils or antenna within pet collars. When the collar receives the avoidance signal, and it is determined to be above a threshold signal strength, it issues one of several types of correction stimuli to the pet to cause the pet to move away from the beacon region. A transmitter beacon/collar avoidance system may be implemented in conjunction with the above referenced wired/wireless pet containment systems. If a pet is being contained by a wired containment system, it is possible to transmit the same type of signal through both the wired containment fence and avoidance beacon. Therefore, if the receiver in the collar picks up the signal from either the containment fence or avoidance beacon, and it is determined to be above a threshold signal strength, the receiver may issue a correction to the pet. This is beneficial as the pet is not required to wear two separate collars and the owner is not required to buy two separate collars.

Wireless containment systems are more complicated. Wireless containment systems issue a correction to the pet upon loss, or decreased signal level of a received transmitter signal. In other words, the presence of a signal determines that the pet is still within the containment region. Creating avoidance regions within the containment region is not as simple as broadcasting a duplicate of the containment signal from a transmitter beacon as this beacon would be an indicator of containment within the boundary. Systems, methods, and apparatus for differentiating between such wireless containment and avoidance signals are described below.

Figure 1:
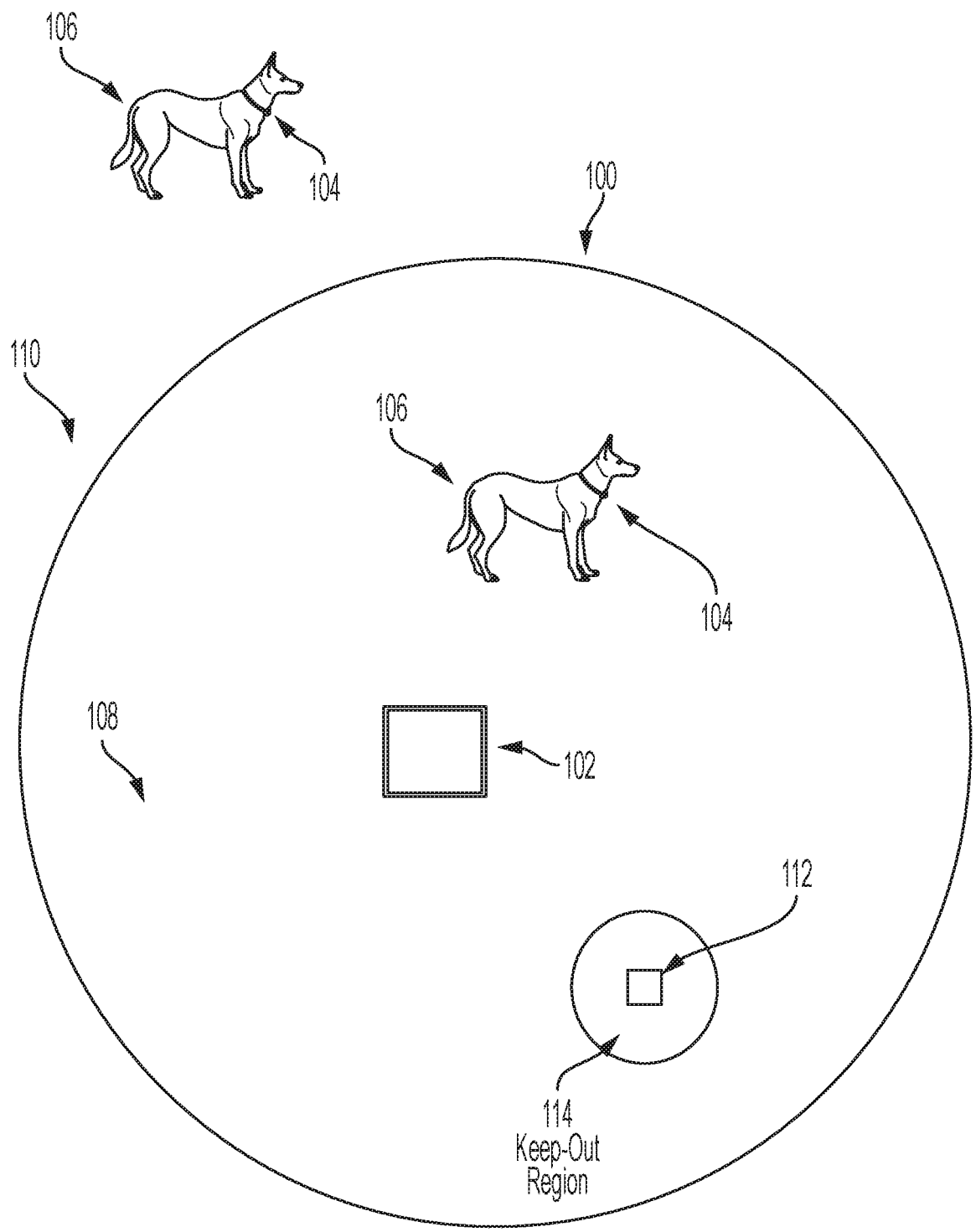
FIG. 1 shows an avoidance region within a containment system, under an embodiment.

FIG. 1 displays a wireless pet containment area 100 including a wireless pet containment transmitter 102 and a wireless pet containment system receiver 104 located in a collar worn by an animal 106. The transmitter periodically transmits an electromagnetic signal. The magnitude of the transmitted field can vary based upon range settings on the transmitter. The output field strength can be varied to cause receiver activation from 10's of feet to several hundred feet, depending on the user's use case. The receiver 104 receives the periodically transmitted electromagnetic signal when in range of the transmitter. The voltage induced on the receiver coils due to the transmitted signal can be as low as several micro-volts while still being detectable. In one implementation, when the signal level drops to a 10 microvolt threshold level, a correction is issued to the pet. Due to the extremely low signal levels, the receiver typically amplifies the incoming signal through several amplification stages that can gain the signal by 10,000 to over 100,000 to allow proper processing. The carrier signal driven from the transmitter, in one implementation is 18.72 kHz. FIG. 1 shows the animal 106 standing within a safe zone 108, i.e. within transmission range of the transmitter. No stimulus is applied to the animal within the safe zone. As the animal and corresponding receiver move away from the wireless pet containment transmitter (i.e. toward the keep out region 110), the signal from the transmitter may diminish below a certain level. When the signal diminishes below a certain level the receiver 104 applies a negative stimulus to the animal thereby encouraging the animal to return to the safe zone 108. FIG. 1 also shows a wireless pet containment system transmitter avoidance beacon 112 and the range of the avoidance beacon's transmission signal, i.e. the beacon's keep out region 114. The avoidance beacon broadcasts an electromagnetic signal. When the animal 106 and receiver 104 enter the keep out region 114, i.e. when the receiver is in range of the avoidance beacon's transmissions, and the signal strength is determined to be above the signal threshold, the receiver 104 applies a negative stimulus to the animal thereby encouraging the animal to return to the safe zone 108. In one implementation, the threshold for the avoidance beacon will be of a similar 10 microvolt magnitude as the threshold for the wireless transmitter threshold.

Figure 2:
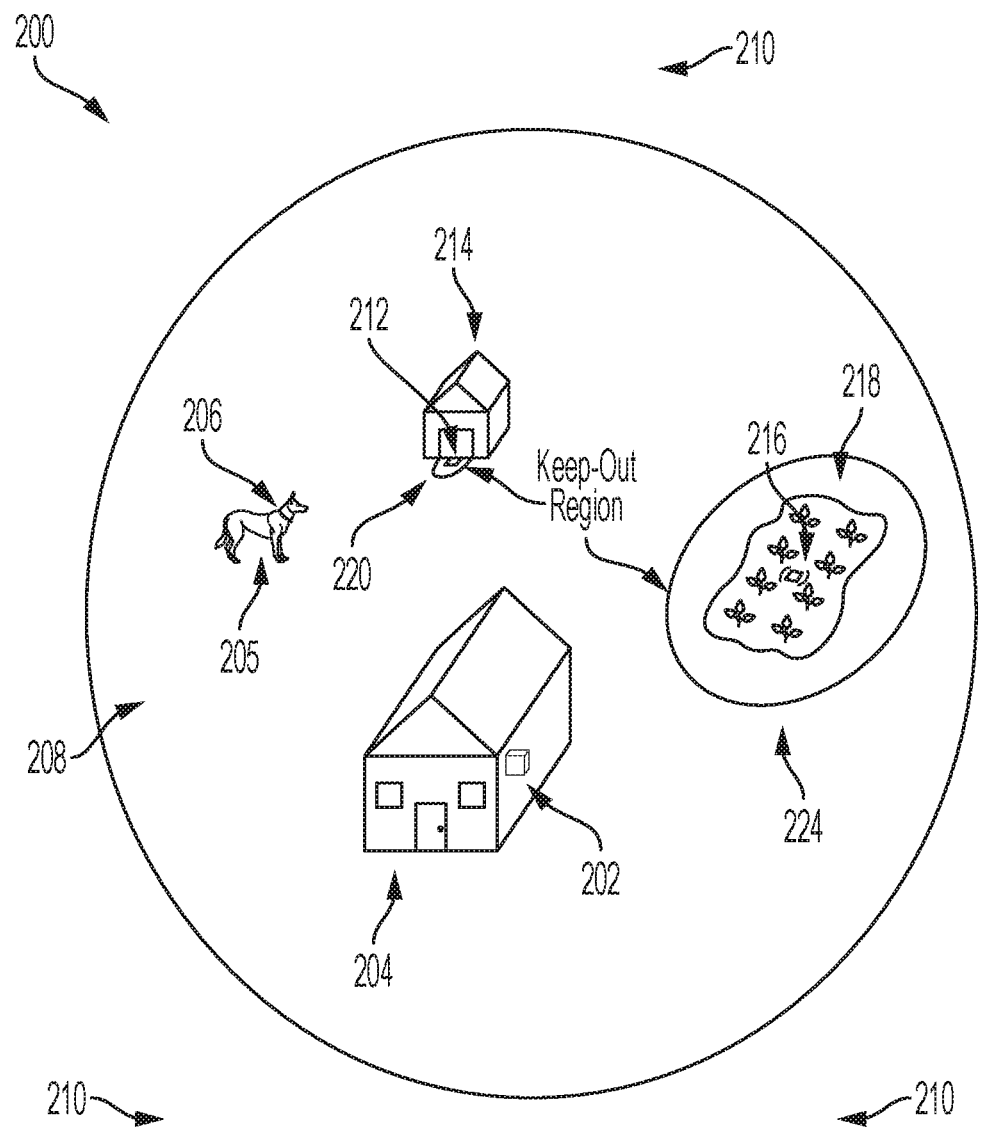
FIG. 2 shows avoidance regions within a containment system, under an embodiment.

FIG. 2 displays a wireless pet containment system 200 including a wireless pet containment transmitter 202 located within house 204 and a wireless pet containment system receiver collar 206 worn by an animal 205. As indicated above, the transmitter periodically transmits an electromagnetic signal. The receiver 206 receives the periodically transmitted signal when in range of the transmitter. FIG. 2 shows the animal 205 standing within a safe zone 208, i.e. within range of the wireless pet containment transmitter 202. No stimulus is applied to the animal within the safe zone. As the animal and corresponding receiver move away from the wireless pet containment transmitter (i.e. toward the keep out region 210), the transmitter signal received by the receiver may diminish below a certain level, the receiver may apply a negative stimulus to the animal thereby encouraging the animal to return to the safe zone 208.

FIG. 2 also shows wireless pet containment system transmitter avoidance beacons 212, 216. As indicated above, beacons periodically transmit an electromagnetic signal. A first beacon 212 is located in a garage 214 and a second beacon 216 is located in a garden 218, under one embodiment. Each beacon's transmission signal defines a keep out zone, i.e. the range of each transmission signal. The keep out zones 220, 224 defined by beacons 212, 216 are located within the safe zone 208 and within range of the wireless pet containment transmitter 202. As the animal enters keep out zone 224, i.e. when the receiver is in range of the avoidance beacon's transmissions, and the signal strength is determined to be above the signal threshold, the receiver 206 applies a negative stimulus to the animal thereby encouraging the animal to return to the safe zone 208. The transmission signal from avoidance beacon 212 similarly creates a keep out zone as already described with respect to beacon 216.

With reference to FIG. 1, a wireless transmitter avoidance beacon 112 works in conjunction with a wireless pet containment system to implement an avoidance area in which the pet should be corrected. The avoidance area 114 is located within a wireless pet containment region 108. The wireless transmitter avoidance beacon 112 may include a receiver 124 (shown in FIG. 5). The receiver 124 detects the containment signal (as transmitted by the wireless pet containment system transmitter 102) and determines the position of gaps within the containment signal. The avoidance beacon 112 then uses the gap information to broadcast a unique avoidance broadcast signal during the gap positions, under an embodiment. The receiver 124 within the avoidance beacon 112 monitors the containment signal and detects start-of-packet and end-of-packet indicators. The packet period is under an embodiment a fixed period of time, the time starting at the first reception of energy and ending when a fixed duration of time has expired. The packet period may be determined by a start and stop data bit combination. The gap period timer begins as soon as the end-of-packet is determined. The gaps extend from end-of-packet indicator to start-of-packet indicator. Upon determination of a gap period, the avoidance beacon starts a delay counter. The delay counter may range from zero to a period of time equal to the gap period minus the time to broadcast the avoidance broadcast signal. Upon expiration of the delay counter, the avoidance beacon broadcasts the avoidance broadcast signal which will complete before the start of the next wireless transmitter packet. Note that the transmission time for the containment packets and gap periods may be known under a transmission protocol. Accordingly, the receiver may simply start transmitting the avoidance signal immediately upon detection of an end of packet indicator or upon such detection plus a predetermined delay.

Figure 3:
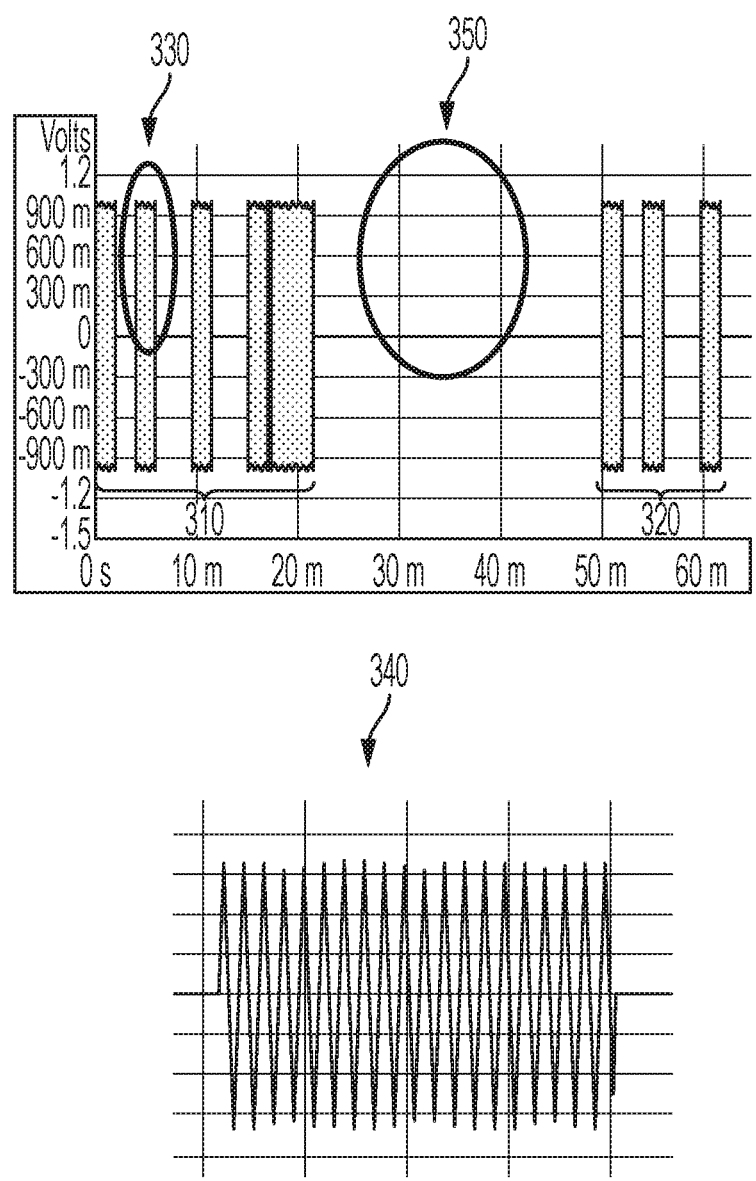
FIG. 3 shows signals of a wireless pet containment transmitter, under an embodiment.

FIG. 3 shows wireless pet containment system transmitter communications, under an embodiment. FIG. 3 illustrates two data packets 310, 320 approximately spanning time periods of 0ms-22 ms and 50 ms-62 ms respectively. (FIG. 3 also shows an enlarged view 340 of the data packet 330). The communication shown in FIG. 3 shows a gap time period 350 between the communication of data packet 310 and data packet 320. As indicated above, the avoidance beacon 112 may use information of the gaps to transmit a unique avoidance broadcast signal during gap positions, under an embodiment.

Figure 4:
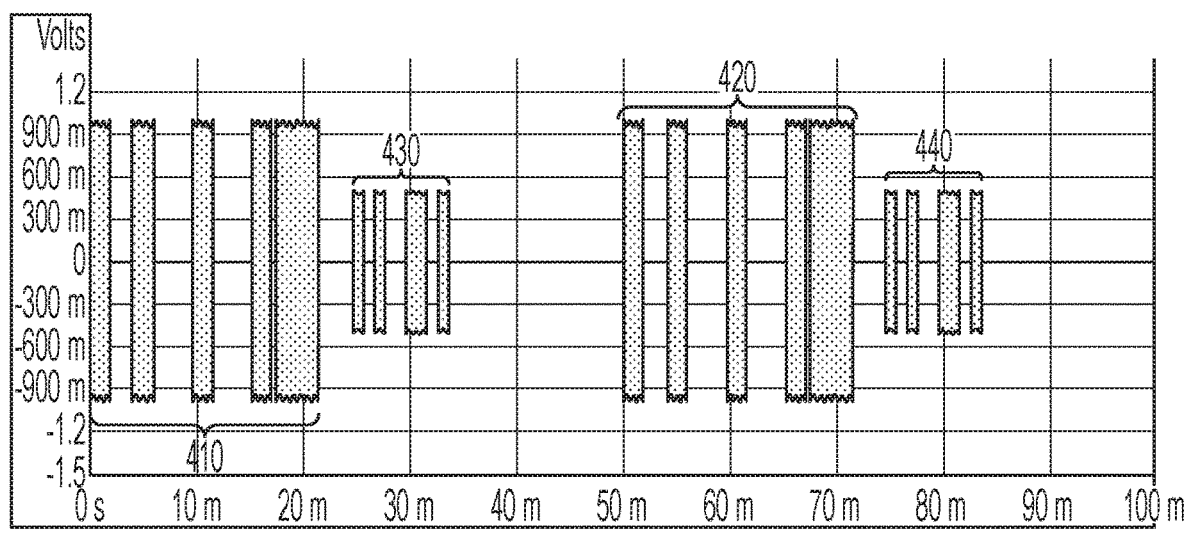
FIG. 4 shows signals of a wireless pet containment transmitter and a wireless pet avoidance beacon, under an embodiment.

FIG. 4 shows containment signal communication cycles (data packets) 410, 420 with avoidance signal communication cycles (data packets) 430, 440 broadcast during the containment signal communication gap periods. The signals are broadcast at whatever signal level is needed to create the desired range for the containment system and avoidance region system, respectively.

Under one embodiment, the containment signal frequency is 18 kHz and develops a voltage of 16 microvolts peak at the output of the collar receiver coils 104 before it is gained up by 10,000 to over 100,000, while the avoidance signal frequency is also at 18 kHz and develops a voltage of 8 microvolts peak at the output of the collar receiver 104 coils before it is gained up by 10,000 to over 100,000. The wireless pet containment transmitter 102 and avoidance beacon 112 may transmit signals using unique modulation methods. Modulation methods may include digital modulation, amplitude modulation, frequency modulation, or other modulation methods. Under one embodiment, the wireless pet containment transmitter 102 and avoidance beacon 112 transmit signals using different modulation methods so that the signals may be differentiated by the pet collar receiver without requiring transmission of avoidance signals during gap periods in the containment signal transmissions.

Figure 5:
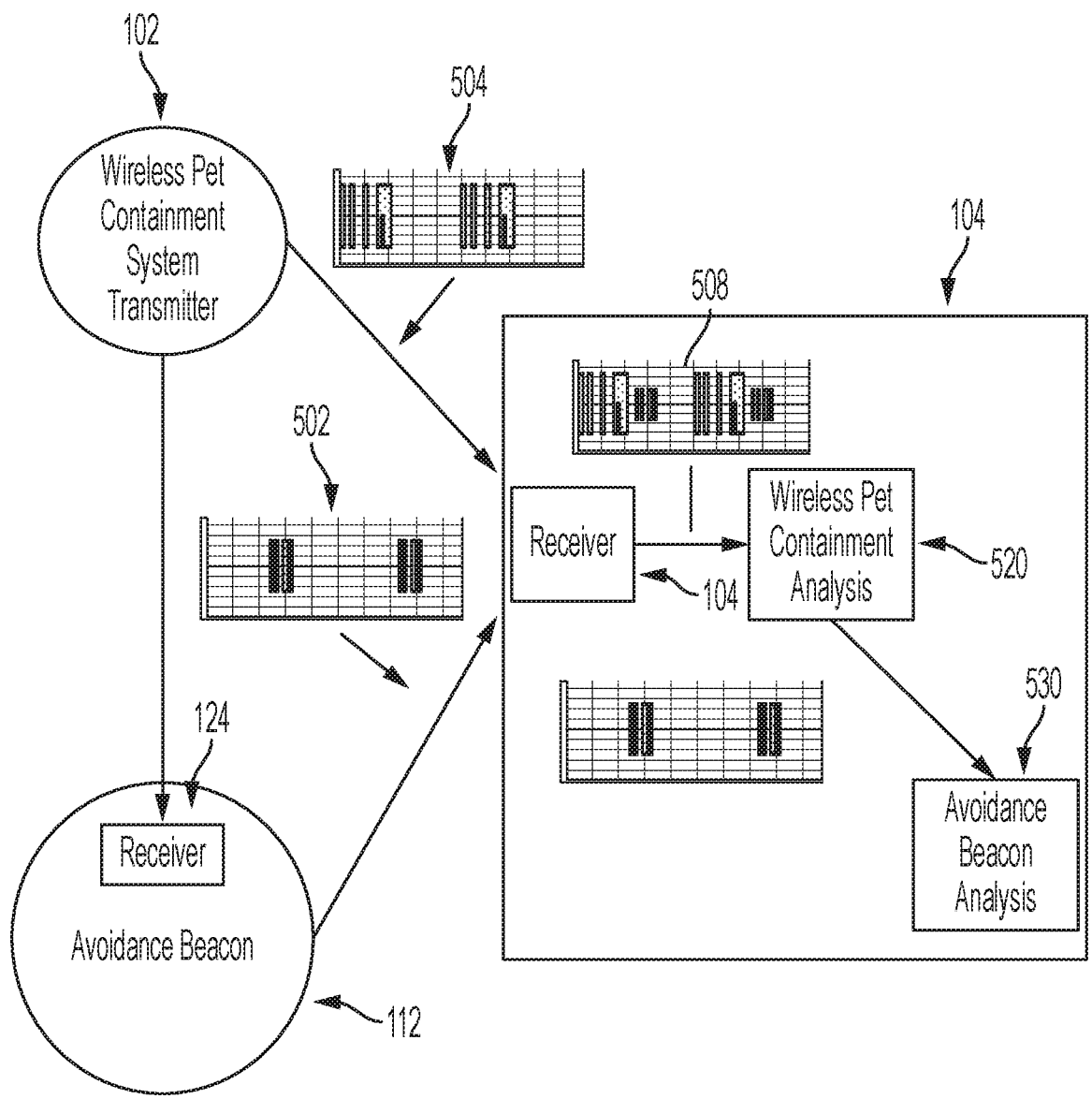
FIG. 5 shows receipt of wireless pet containment transmitter signals and wireless pet avoidance beacon signals in a collar, under an embodiment.

FIG. 5 shows receipt of wireless pet containment transmitter signals and avoidance beacon signals in a collar, under an embodiment. FIG. 5 shows a wireless pet containment system transmitter 102 and an avoidance beacon 112 (as also shown in FIG. 1). The avoidance beacon includes receiver 124 under an embodiment. The wireless pet containment system transmitter 102 transmits signal 504 using a first modulation method. The avoidance beacon 112 transmits signal 502 using a second modulation method different from the first method. (The avoidance beacon 112 may or may not transmit data within gaps of the wireless containment signal). The receiver 104 then receives a combined signal. The receiver demodulates the signal. A wireless containment component 520 then analyzes the demodulated wireless containment signal 504. An avoidance beacon component 530 then analyzes the demodulated avoidance beacon signal 502. When the wireless pet containment transmitter 102 and avoidance beacon 112 transmit signals using different modulation methods, the signals may be differentiated by the pet collar receiver without requiring transmission of avoidance signals during gap periods in the containment signal transmissions.

Under an embodiment, the avoidance signals are transmitted during gap periods in the containment signal transmissions as already described above. Under this embodiment, the containment signal includes gap information as described above (e.g., end of packet and start of packet indicators in the signal). The collar receiver may use this information in order to detect the avoidance signal and extract the avoidance signal. The receiver of such embodiment uses gap information to extract the avoidance signal irrespective of modulation method, i.e. whether a common or differing modulation method is used for the containment and avoidance signal. Under one embodiment, the receiver simply looks for the avoidance transmission between end of packet and start of packet indicators. The transmission time for the containment packets, avoidance packets, and gap periods may be known under a transmission protocol. Accordingly, the collar may use this duration information to identify gap periods. Under an embodiment, the collar receiver may measure a duration of the containment packet (which is known according to a transmission protocol). The collar receiver may use this information to identify containment packets (and therefore gap periods) and then look for the alternative beacon signal after cessation of the containment signal (or within gap periods). Further, the receiver may also measure a duration of the avoidance packet (which is known according to a transmission protocol). The collar receiver may then use this measured duration to identify the avoidance signal. Under yet another alternative embodiment, the containment and beacon packets include data which identify the packet. The collar receiver then demodulates each signal and identifies the respective signal as a containment signal or avoidance signal. This particular embodiment may identify containment and avoidance signals when a common modulation scheme is used for the containment signal and the avoidance signal.

When the pet collar receives and detects/analyzes the unique avoidance signal and it is determined that the signal is above a threshold, a stimulus is administered to the pet to discourage the pet from remaining in proximity to the avoidance beacon. Note, that the threshold may be zero, indicating any reception of the unique avoidance signal will cause a stimulus to be applied.

Again with reference to FIG. 1, a wireless transmitter avoidance beacon 112 works in conjunction with a wireless pet containment system to implement an avoidance area 114 in which the pet should be corrected. The avoidance area 114 is located within a wireless pet containment region 108. The avoidance beacon broadcasts under one embodiment an electromagnetic signal of a different frequency than the frequency of the wireless pet containment transmitter. The receiver 104 may include a filter to separate the avoidance signal broadcasts and containment signal broadcasts. The receiver filters incoming signals to detect an avoidance signal. If an avoidance signal is detected and it is determined that the signal is above a threshold, a stimulus is administered to the pet to discourage the pet from remaining in proximity to the avoidance beacon. Note, that the threshold may be zero, indicating any reception of the unique avoidance signal will cause a stimulus to be applied.

Figure 6:
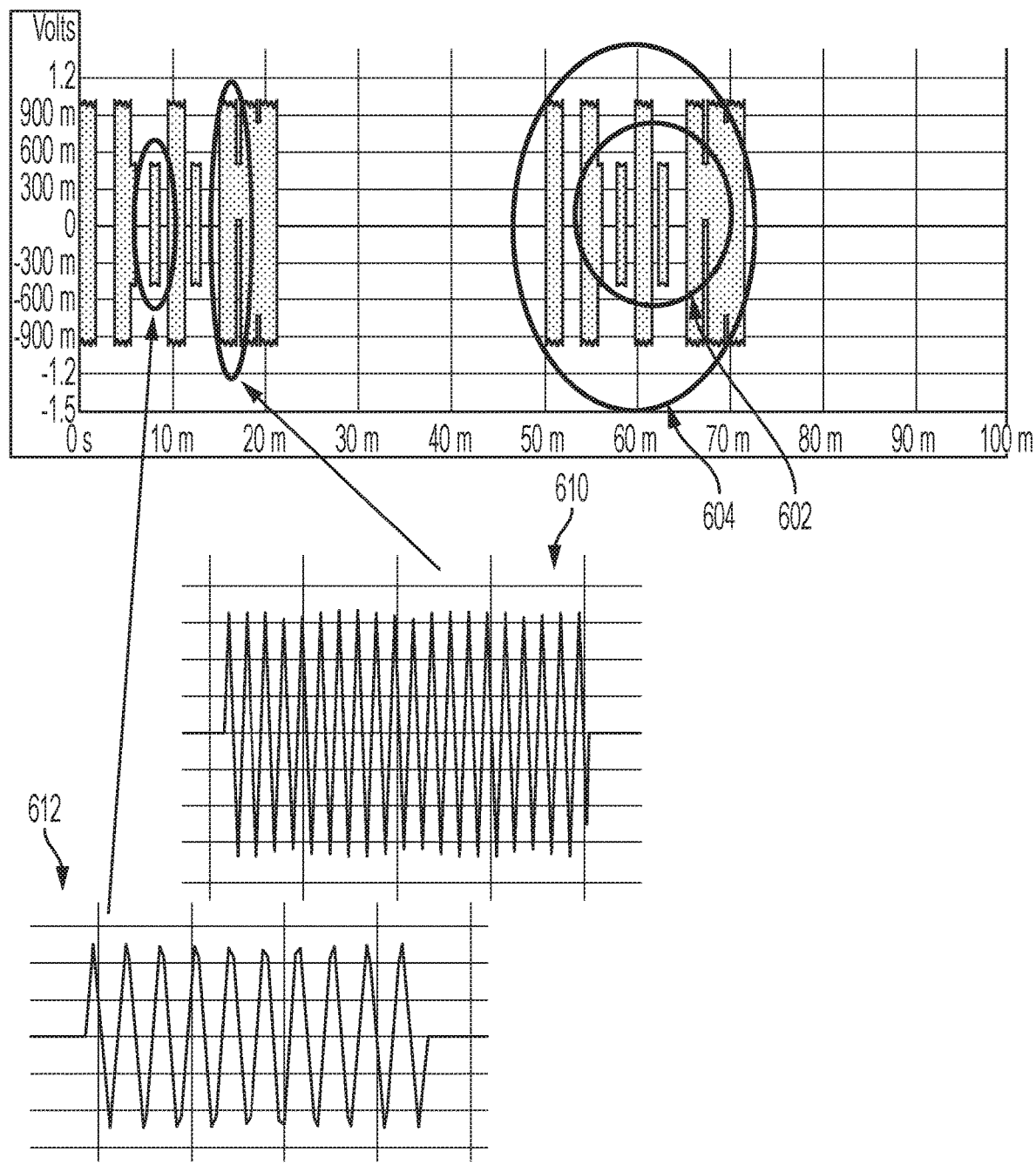
FIG. 6 shows signals of a wireless pet containment transmitter and a wireless pet avoidance beacon, under an embodiment.

FIG. 6 shows containment signal communication cycles (data packets) 604 and avoidance signal communication cycles (packets) 602 broadcast asynchronously. The containment signal communication frequency 610 and avoidance signal communication frequency 612 are different allowing filtering at the receiver to separate signals. This embodiment eliminates any requirement for the presence of a receiver in the avoidance beacon. In one implementation the carrier signal driven from the transmitter is driven at 18.72 kHz. In this implementation, the avoidance beacon signal is driven at 20.0 kHz.

Two methods are available to differentiate the containment signal from the avoidance signal in the receiver. One method involves separate sets of high-quality-factor (high Q) coil antennas for each distinct frequency. Each set of coils would then feed an amplification and narrowband band-pass filtering path. One path centered on 18.72 kHz and one path centered on 20.0 kHz. The band-pass filtering can be accomplished in hardware or software.

An alternative method involves a single set of lower-quality-factor (lower Q) coil antennas to pick up both frequencies. The single set of coils would be centered on the lower-powered avoidance signal. The higher-powered containment signal would be attenuated 6 to 10 dB in the scenario where the two frequencies are 18.72 kHz and 20 kHz. The coil output would then feed two amplification and narrowband band-pass filtering paths. One path centered on 18.72 kHz and one path centered on 20.0 kHz. The band-pass filtering can be accomplished in hardware or software.

Figure 7:
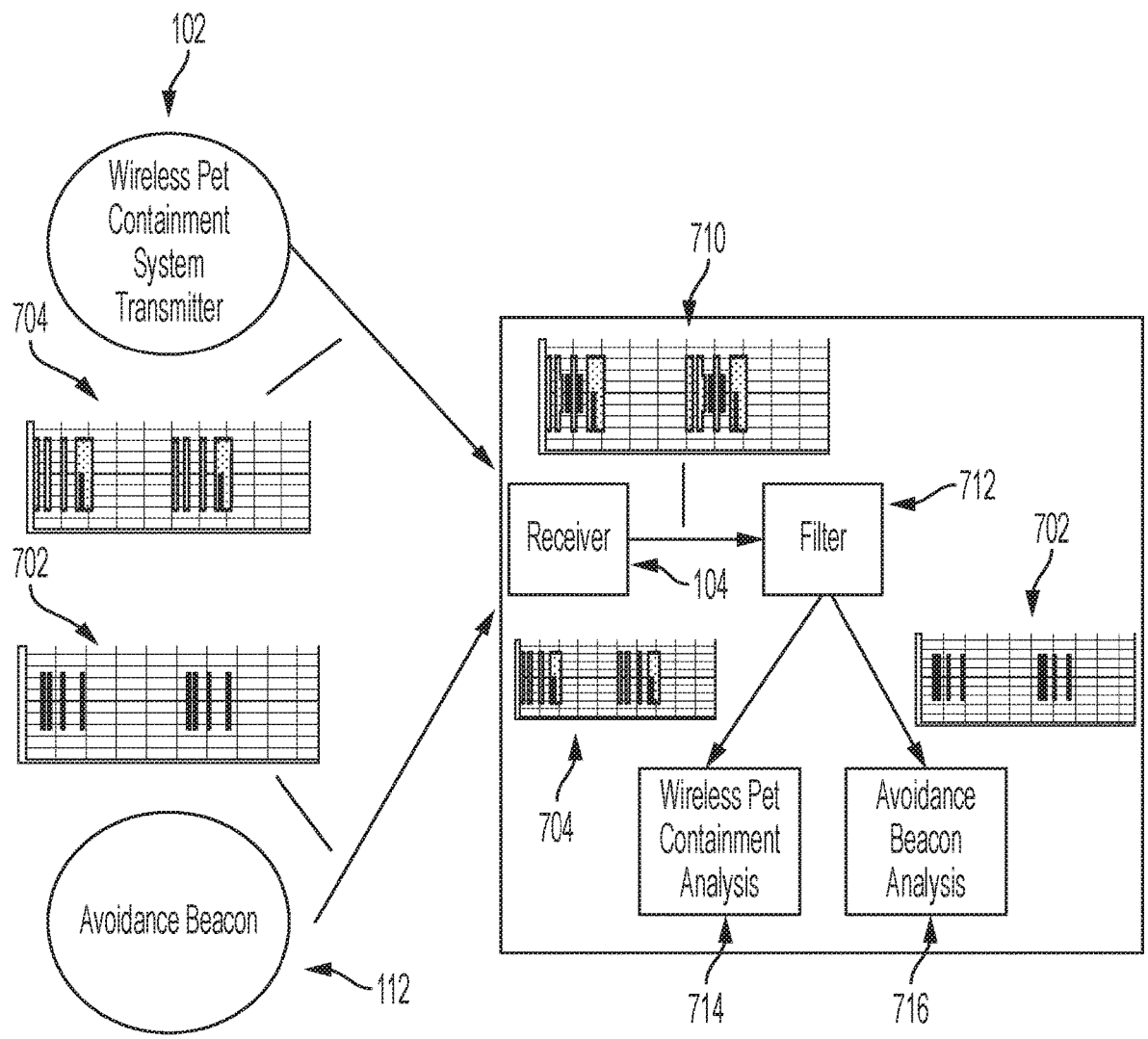
FIG. 7 shows receipt of wireless pet containment transmitter signals and wireless pet avoidance beacon signals in a collar, under an embodiment.

FIG. 7 shows a wireless pet containment system transmitter 102 and an avoidance beacon 112. The wireless pet containment system transmitter transmits signal 704 at a first frequency. The avoidance beacon transmits signal 702 at a second frequency different from the first frequency. The receiver 104 then receives a combined signal 710 (which of course includes the lower-powered avoidance signal and the higher-powered containment signal). The receiver filters 712 and separates the combined signal into the containment signal 704 and the avoidance signal 702. The receiver circuitry (i.e. a containment signal analysis component) may then analyze 714 the containment signal to determine potential proximity to a containment boundary. The receiver circuitry (i.e. an avoidance signal analysis component) may also analyze 716 the avoidance signal. As indicated above, if it is determined that the avoidance signal is above a threshold, a stimulus is administered to the pet to discourage the pet from remaining in proximity to the avoidance beacon.

Again with reference to FIG. 1, a wireless transmitter avoidance beacon 112 works in conjunction with a wireless pet containment system transmitter 102 to implement an avoidance area in which the pet should be corrected. The avoidance area 114 is located within a wireless pet containment region 108. The avoidance beacon and wireless pet containment system transmitter may broadcast data using direct sequence spread spectrum (DSSS), under an embodiment. In DSSS, every data bit is divided into a higher data rate using a pseudo random noise spreading code (otherwise known as chipping code). The codes used by the avoidance beacon and wireless pet containment system should be orthogonal thereby allowing the receiver to detect each signal in the presence of the other. The pet containment system receiver correlates the incoming signal(s) to the known pseudo random noise signal of the avoidance beacon and the known pseudo random noise signal of the of the wireless pet containment system to reconstruct the datastreams of each original signal. If the avoidance beacon data stream is detected, and it is determined that the signal is above a threshold, a stimulus is administered to the pet to discourage the pet from remaining in proximity to the avoidance beacon. Note, that the threshold may be zero, indicating any reception of the unique avoidance signal will cause a stimulus to be applied.

Figure 8:
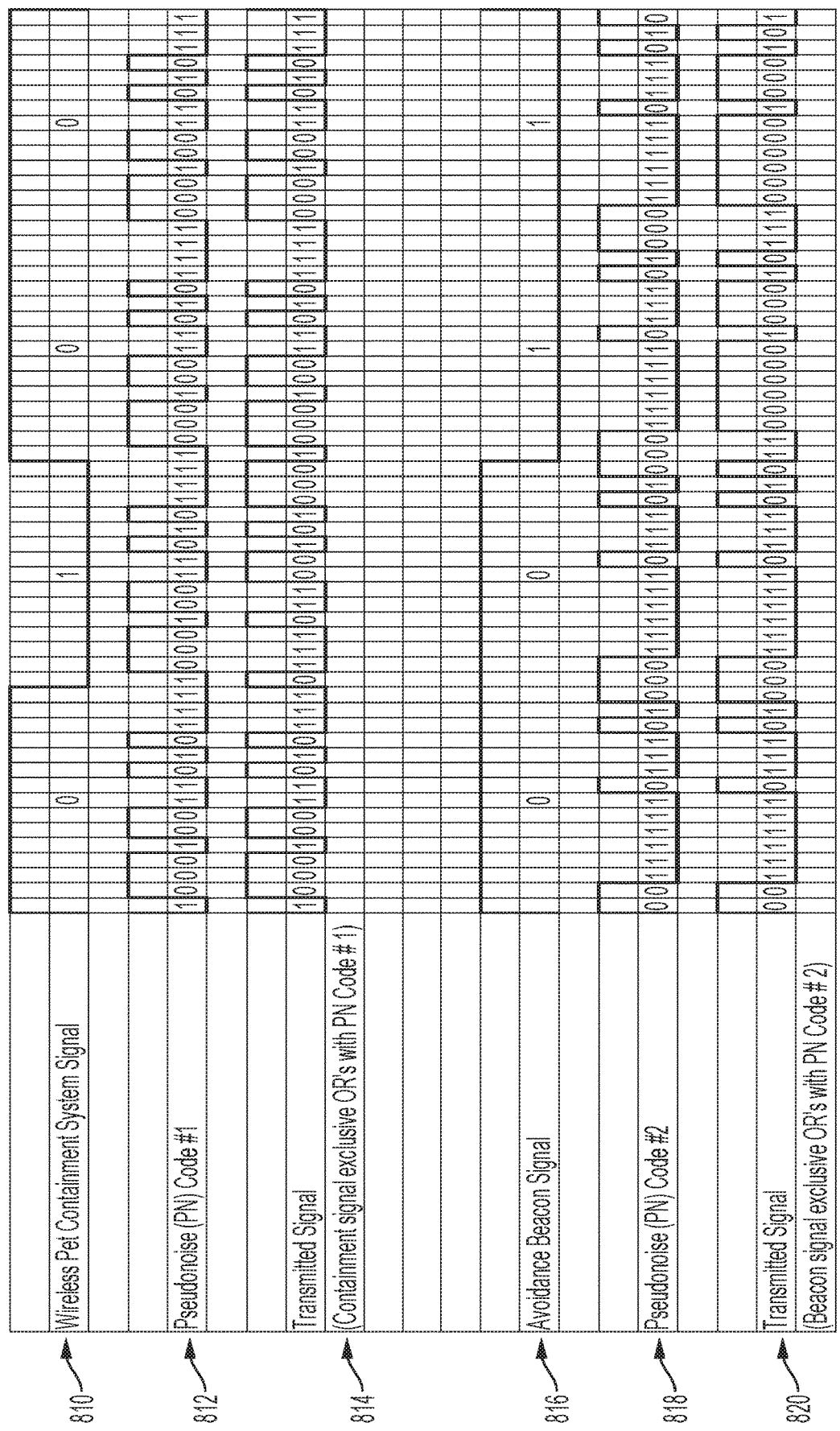
FIG. 8 shows direct sequence spread spectrum (DSSS) transmission of pet containment transmitter signals and wireless pet avoidance beacon signals, under an embodiment.

FIG. 8 shows a wireless pet containment signal 810 and Pseudonoise code #1 (PN1) 812. The containment signal and PN1 are XORed to produce transmitted signal 814. FIG. 8 show an avoidance signal 816 and Pseudonoise code #2 (PN2) 818. The avoidance signal and PN2 are XORed to produce transmitted signal 820.

Figure 9:
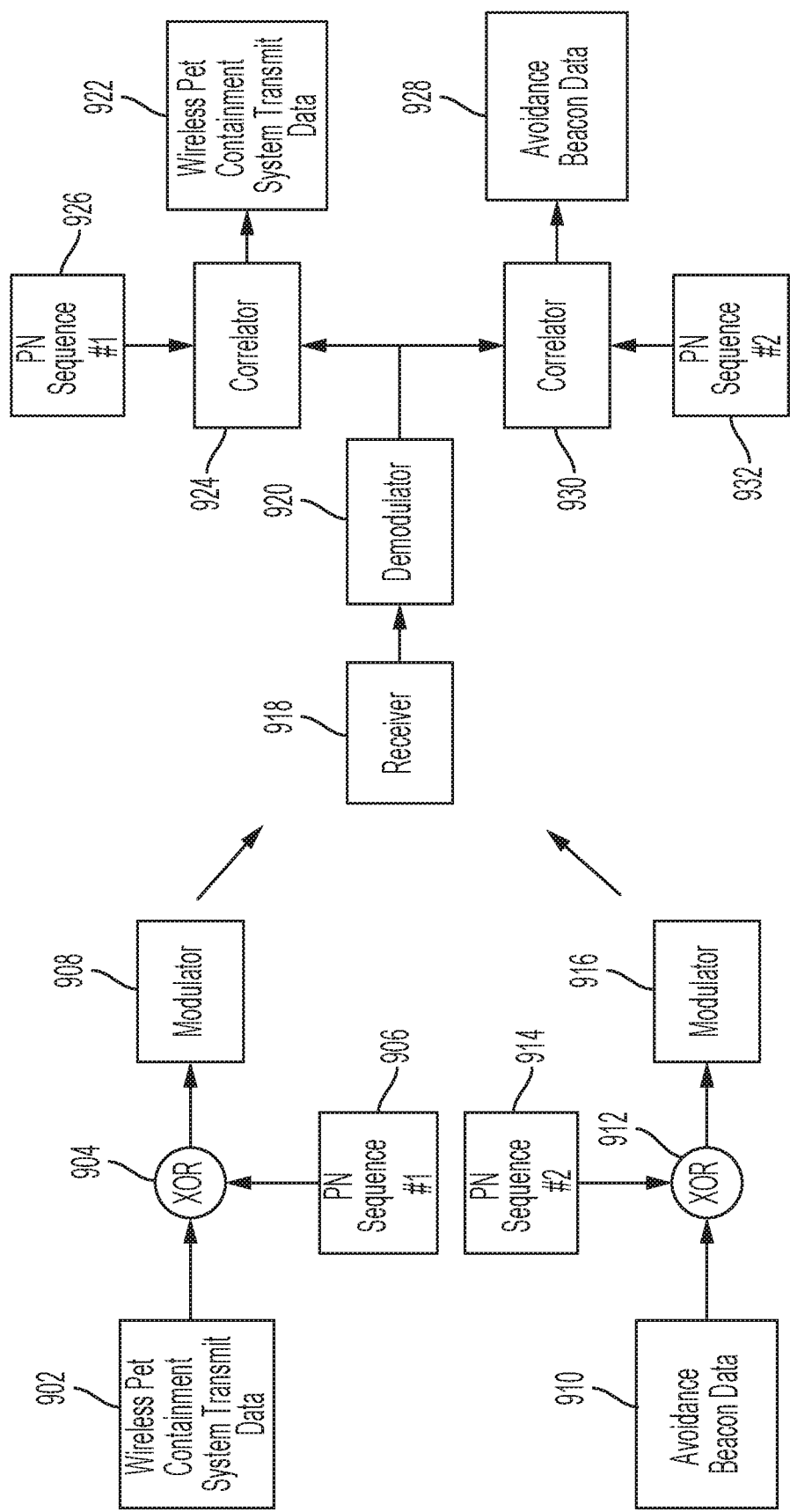
FIG. 9 shows de-spreading and separation of pet containment transmitter signals and wireless pet avoidance beacon signals in a collar, under an embodiment.

FIG. 9 shows a containment signal 902 XORed 904 with PN1 906. The resulting signal is then modulated and transmitted 908. FIG. 9 also shows an avoidance signal 910 XORed 912 with PN2 914. The resulting signal is then modulated and transmitted 916. The receiver 918 then receives a combined signal comprising both transmitted signal 908 and transmitted signal 916. The received signal is then demodulated 920. The containment signal 922 is recovered through correlation 924 with PN1 926. The avoidance signal 928 is recovered through correlation 930 with PN2 932. PN codes are chosen so as to have low cross-correlation (i.e. low cross-correlation with other PN codes in a family) and high auto-correlation. When looking for PN code 1, and PN code 2 is arriving, there is never enough of a correlation to trigger a match. When looking for PN code 1, and PN code 1 is arriving, there is a high correlation peak when the signals overlap, even in the presence of other signals and/or noise.

A system is described herein comprising under an embodiment a first transmitter for transmitting a first signal at a first frequency. The system includes a second transmitter for transmitting a second signal at a second frequency. The system includes a collar unit comprising a receiver for receiving a combined signal, wherein the combined signal comprises the first signal and the second signal, wherein the receiver includes a first antenna for detecting the first signal and a second antenna for detecting the second signal, wherein the first antenna is tuned to the first frequency, wherein the second antenna is tuned to the second frequency. The system includes the collar unit comprising a stimulus unit, wherein the collar unit is configured for wear by an animal, wherein the stimulus unit is configured to deliver a stimulus to the animal. The system includes the collar unit comprising a first signal analysis component and a second signal analysis component. The system includes the first signal analysis component configured to analyze the first signal, wherein the analyzing the first signal comprises instructing the stimulus delivery unit to deliver a first stimulus to the animal when a first voltage of the first signal falls below a first threshold value. The system includes the second signal analysis component configured to analyze the second signal, wherein the analyzing the second signal comprises instructing the stimulus delivery unit to deliver a second stimulus to the animal when a second voltage of the second signal exceeds a second threshold value.

The receiver of an embodiment includes a first narrow-band band pass filter centered at the first frequency of the first detected signal for isolating the first detected signal from nearby signal frequencies.

The first frequency of an embodiment comprises 18.72 kilohertz.

The receiver of an embodiment includes a second narrow-band band pass filter centered at the second frequency of the second detected signal for isolating the second detected signal from nearby signal frequencies.

The second frequency of an embodiment comprises 20 kilohertz.

A first range of the first signal defines a first boundary of a containment area, wherein the delivery of the first stimulus discourages the animal from leaving the containment area, under an embodiment.

A second range of the second signal defines a second boundary of an avoidance region, wherein the delivery of the second stimulus discourages the animal from entering the avoidance area of an embodiment, under an embodiment.

The range of the first signal is greater than the range of the second signal, under an embodiment.

The second boundary of the avoidance region is located within the first boundary of the containment area, under an embodiment.

The first signal and the second signal comprise an electromagnetic signal, under an embodiment.

The first antenna and the second antenna comprise coil antennas, under an embodiment.

A system is described herein comprising under an embodiment a first transmitter for transmitting a first signal at a first frequency. The system includes a second transmitter for transmitting a second signal at a second frequency. The system includes a collar unit comprising a receiver for receiving a combined signal, wherein the combined signal comprises the first signal and the second signal, wherein the receiver comprises an antenna tuned to detect a range of frequencies including the first frequency and the second frequency. The system includes the receiver including a first filter and a second filter, the first filter configured to isolate the first signal from the combined signal, and the second filter configured to isolate the second signal from the combined signal. The system includes the collar unit comprising a stimulus unit, wherein the collar unit is configured for wear by an animal, wherein the stimulus unit is configured to deliver a stimulus to the animal. The system includes the collar unit comprising a first signal analysis component and a second signal analysis component. The system includes the first signal analysis component configured to analyze the first signal, wherein the analyzing the first signal comprises instructing the stimulus delivery unit to deliver a first stimulus to the animal when a first voltage of the first signal falls below a first threshold value. The system includes the second signal analysis component configured to analyze the second signal, wherein the analyzing the second signal comprises instructing the stimulus delivery unit to deliver a second stimulus to the animal when a second voltage of the second signal exceeds a second threshold value.

The first filter of an embodiment applies a first narrow-band band pass filter centered at the first frequency to the combined signal to isolate the first signal.

The first frequency of an embodiment comprises 18.72 kilohertz.

The second filter applies a second narrow-band band pass filter centered at the second frequency to the combined signal to isolate the second signal, under an embodiment.

The second frequency of an embodiment comprises 20 kilohertz.

A first range of the first signal defines a first boundary of a containment area, wherein the delivery of the first stimulus discourages the animal from leaving the containment area, under an embodiment.

A second range of the second signal defines a second boundary of an avoidance region, wherein the delivery of the second stimulus discourages the animal from entering the avoidance area, under an embodiment.

The range of the first signal is greater than the range of the second signal, under an embodiment.

The second boundary of an avoidance region is located within the first boundary of the containment area, under an embodiment.

The first signal and the second signal comprise an electromagnetic signal, under an embodiment.

The first antenna and the second antenna comprise coil antennas, under an embodiment.

A system is described herein comprising under an embodiment a first transmitter for transmitting a first signal, wherein the first signal comprises periodic transmissions of first data packets. The system includes a second transmitter for transmitting a second signal, wherein the second transmitter comprises a first receiver for monitoring the first signal to identify gap periods between the periodic transmissions of the first data packets, wherein the second transmitter is configured to use information of the gap periods to transmit a second signal during the gap periods. The system includes a collar unit comprising a second receiver for receiving a combined signal, wherein the combined signal comprises the first signal and the second signal, wherein the second receiver comprises a filter configured to filter the first signal and the second signal from the combined signal, wherein the filtering includes identifying the gap periods in the first signal, wherein the filtering includes using information of the gap periods to separate the first signal and the second signal. The system includes the collar unit comprising a stimulus unit, wherein the collar unit is configured for wear by an animal, wherein the stimulus unit is configured to deliver a stimulus to the animal. The system includes the collar unit comprising a first signal analysis component and a second signal analysis component. The system includes the first signal analysis component configured to analyze the first filtered signal, wherein the analyzing the first filtered signal comprises instructing the stimulus delivery unit to deliver a first stimulus to the animal when a first voltage of the first filtered signal falls below a first threshold value. The system includes the second signal analysis component configured to analyze the second filtered signal, wherein the analyzing the second filtered signal comprises instructing the stimulus delivery unit to deliver a second stimulus to the animal when a second voltage of the second filtered signal exceeds a second threshold value.

The second receiver identifying the gap periods includes identifying start of packet indicators and end of packet indicators of the first data packets in the first signal, wherein a start of packet indicator indicates a beginning of a first data packet of the first data packets, where an end of packet indicator indicates an end of a first data packet of the first data packets, under an embodiment.

The filter identifying the gap periods includes timing durations of data packet transmissions in the combined signal and identifying data packets as the first data packets when the data packets comprise a known duration under an embodiment.

The filter identifying the gap periods includes identifying the gap periods as periods of time between the identified first data packets, under an embodiment.

The first transmitter modulates first information onto the first signal using a modulation method, wherein the first information identifies the first signal, under an embodiment.

The filter identifying the gap periods includes demodulating the combined signal and using the first information to identify the first signal, under an embodiment.

The filter identifying the gap periods includes identifying the gap periods as periods of time between the demodulated first data packets, under an embodiment.

A first range of the first signal defines a first boundary of a containment area, wherein the delivery of the first stimulus discourages the animal from leaving the containment area, under an embodiment.

A second range of the second signal defines a second boundary of an avoidance region, wherein the delivery of the second stimulus discourages the animal from entering the avoidance area, under an embodiment.

The range of the first signal is greater than the range of the second signal, under an embodiment.

The second boundary of an avoidance region is located within the first boundary of the containment area, under an embodiment.

The first signal and the second signal comprise an electromagnetic signal, under an embodiment.

The first antenna and the second antenna comprise coil antennas, under an embodiment.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems, methods, and apparatus for establishing keep out zones within wireless containment regions can be a component of a single system, multiple systems, and/or geographically separate systems. The systems, methods, and apparatus for establishing keep out zones within wireless containment regions can also be a subcomponent or subsystem of a single system, multiple systems, and/or geographically separate systems. The components of systems, methods, and apparatus for establishing keep out zones within wireless containment regions can be coupled to one or more other components (not shown) of a host system or a system coupled to the host system.

One or more components of the systems, methods, and apparatus for establishing keep out zones within wireless containment regions and/or a corresponding interface, system or application to which the systems, methods, and apparatus for establishing keep out zones within wireless containment regions is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems, methods, and apparatus for establishing keep out zones within wireless containment regions can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems, methods, and apparatus for establishing keep out zones within wireless containment regions and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems, methods, and apparatus for establishing keep out zones within wireless containment regions and corresponding systems and methods include: microcontrollers with memory (such as electronically erasable programmable read only memory (EEPROM)), embedded microprocessors, firmware, software, etc. Furthermore, aspects of the systems, methods, and apparatus for establishing keep out zones within wireless containment regions and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems, methods, and apparatus for establishing keep out zones within wireless containment regions is not intended to be exhaustive or to limit the systems and methods to the precise forms disclosed. While specific embodiments of, and examples for, the systems, methods, and apparatus for establishing keep out zones within wireless containment regions and corresponding systems and methods are described herein for illustrative purposes, various equivalent modifications are possible within the scope of the systems and methods, as those skilled in the relevant art will recognize. The teachings of the systems, methods, and apparatus for establishing keep out zones within wireless containment regions and corresponding systems and methods provided herein can be applied to other systems and methods, not only for the systems and methods described above.

The elements and acts of the various embodiments described above can be combined to provide further embodiments. These and other changes can be made to the systems, methods, and apparatus for establishing keep out zones within wireless containment regions and corresponding systems and methods in light of the above detailed description.

We claim:

1. A system comprising,
a first transmitter for transmitting a first signal, wherein the first signal comprises periodic transmissions of first data packets;
a second transmitter for transmitting a second signal, wherein the second transmitter comprises a first receiver for monitoring the first signal to identify gap periods between the periodic transmissions of the first data packets, wherein the second transmitter is configured to use information of the gap periods to transmit a second signal during the gap periods;
a collar unit comprising a second receiver for receiving a combined signal, wherein the combined signal comprises the first signal and the second signal, wherein the second receiver comprises a filter configured to filter the first signal and the second signal from the combined signal, wherein the filtering includes identifying the gap periods in the first signal, wherein the filtering includes using information of the gap periods to separate the first signal and the second signal;
the collar unit comprising a stimulus unit, wherein the collar unit is configured for wear by an animal, wherein the stimulus unit is configured to deliver a stimulus to the animal;
the collar unit comprising a first signal analysis component and a second signal analysis component;
the first signal analysis component configured to analyze the first filtered signal, wherein the analyzing the first filtered signal comprises instructing the stimulus delivery unit to deliver a first stimulus to the animal when a first voltage of the first filtered signal falls below a first threshold value; and
the second signal analysis component configured to analyze the second filtered signal, wherein the analyzing the second filtered signal comprises instructing the stimulus delivery unit to deliver a second stimulus to the animal when a second voltage of the second filtered signal exceeds a second threshold value.

2. The system of claim 1, wherein the identifying the gap periods includes identifying start of packet indicators and end of packet indicators of the first data packets in the first signal, wherein a start of packet indicator indicates a beginning of a first data packet of the first data packets, where an end of packet indicator indicates an end of a first data packet of the first data packets.

3. The system of claim 1, wherein the identifying the gap periods includes timing durations of data packet transmissions in the combined signal and identifying data packets as the first data packets when the data packets comprise a known duration.

4. The system of claim 3, wherein the identifying the gap periods includes identifying the gap periods as periods of time between the identified first data packets.

5. The system of claim 1, wherein the first transmitter modulates first information onto the first signal using a modulation method, wherein the first information identifies the first signal.

6. The system of claim 5, wherein the identifying the gap periods includes demodulating the combined signal and using the first information to identify the first signal.

7. The system of claim 6, wherein the identifying the gap periods includes identifying the gap periods as periods of time between the demodulated first data packets.

8. The system of claim 1, wherein a first range of the first signal defines a first boundary of a containment area, wherein the delivery of the first stimulus discourages the animal from leaving the containment area.

9. The system of claim 8, wherein a second range of the second signal defines a second boundary of an avoidance region, wherein the delivery of the second stimulus discourages the animal from entering the avoidance area.

10. The system of claim 9, wherein the range of the first signal is greater than the range of the second signal.

11. The system of claim 10, wherein the second boundary of an avoidance region is located within the first boundary of the containment area.

12. The system of claim 1, wherein the first signal and the second signal comprise an electromagnetic signal.

* * * * *